Patented Mar. 26, 1940

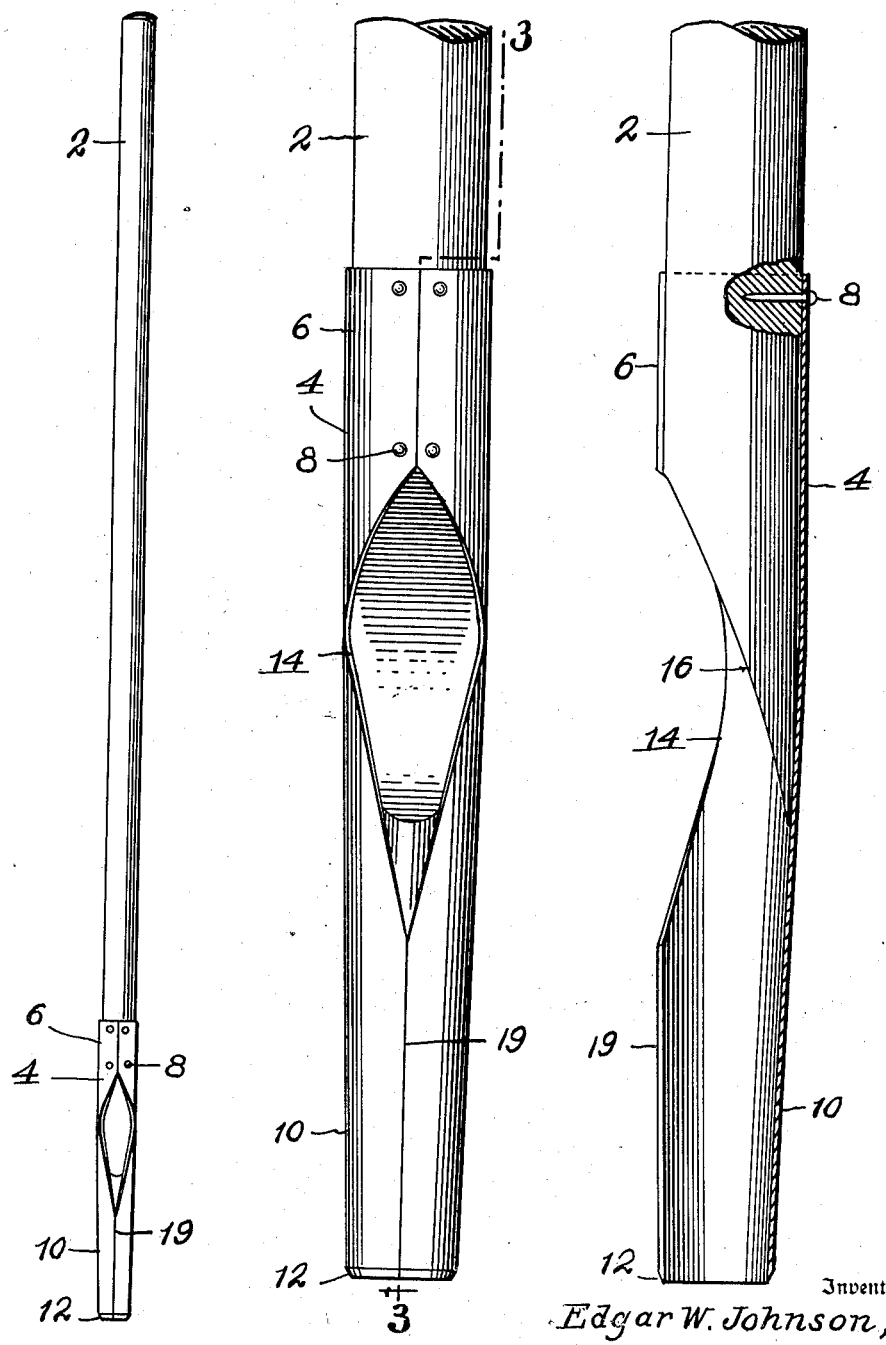

2,194,597

UNITED STATES PATENT OFFICE 2,194,597

WEED EXTRACTOR

Edgar W. Johnson, Kansas City, Mo.

Application May 23, 1938, Serial No. 209,541

1 Claim. (Cl. 55—18)

My invention relates to a weed extractor and my object is to provide a simple and inexpensive manually operated implement designed for use in removing weeds from lawns and grass plots, and is particularly adapted for use in removing dandelions and other noxious plants.

The tool or implement includes a handle provided at its lower end with a tubular cutter which is adapted to remove the root along with the remainder of the plant.

Other features will hereinafter appear and in order that the invention may be fully understood reference will now be had to the accompanying drawing, in which:

Fig. 1 is a front elevation of the device.

Fig. 2 is an enlarged broken front elevation of the device.

Fig. 3 is a section on line 3—3 of Fig. 2 with the handle in elevation.

In carrying out the invention I provide a handle 2 preferably made of wood and provided at its lower end with a rigidly mounted tubular member 4 which is preferably stamped from one piece of sheet metal.

The upper portion of the tubular member 4 constitutes a ferrule 6 of uniform diameter throughout its length, into which the lower portion of the handle 2 snugly fits and is firmly secured by suitable elements such as nails 8. The lower portion of the tubular member 4 is tapered downward and terminates in a beveled cutting edge 12.

The intermediate portion of the tubular member 4 is provided with a longitudinal peripheral aperture 14 of approximately elliptical form, the widest portion of which is equal, or approximately equal, to the interior diameter of said tubular member so that the core of earth cut thereby, as will hereinafter be explained, may readily pass outward through said aperture.

Handle 2 is made in one piece of uniform diameter down to the upper end of the aperture 14, the remainder of said handle tapering downward and rearward from said aperture as indicated at 16, and is almost equal in length to the aperture.

Preparatory to extracting a dandelion or other small weed from the ground, the handle 2 is firmly grasped and the cutting edge 12 of the tubular member 4 is placed in position over the weed and then forced into the soil by pushing downward upon the handle until the lower end of the aperture 14 closely approaches the surface of the soil. The tool is then rotated axially to loosen the respective lower ends of the core and the weed from the underlying soil. An upward pull on the handle withdraws the implement from the soil, together with the weed and the core of earth in which the root of the weed is embedded. The foregoing operation is repeated in extracting other weeds from the ground.

As each weed is extracted along with the core of earth, the preceding core with its associated weed is automatically forced outward through the aperture 14, the discharge being facilitated by the upward flare of the tapered portion 10 of the tubular member 4 and the tapered lower end 16 of the handle 2. From the foregoing it will be understood that the operator will not have to stop extracting the weeds to take the cores from the tubular member 4, and hence will be able to remove a large number of weeds from a lawn at a small expenditure of time and labor.

While I have shown the preferred form of my device I reserve all rights to such other changes and modifications as properly fall within the spirit and scope of the invention as claimed.

Having thus described my invention, what I claim and desire to secure by Letters Patent, is:

A tool of the character described comprising a tubular member the upper portion of which constitutes a ferrule of uniform diameter throughout its length, the remainder of said tubular member being downwardly tapered and terminating in a beveled cutting edge, a peripheral aperture of approximately elliptical form in the forward portion of and intermediate the ends of the tubular member and approximately one-half the length thereof, and a one-piece handle secured in the ferrule and of uniform diameter down to the upper end of the peripheral aperture, the remainder of said handle tapering downward and rearward from the aperture and almost equal in length thereto.

EDGAR W. JOHNSON.